(12) United States Patent
Song et al.

(10) Patent No.: US 12,401,437 B2
(45) Date of Patent: Aug. 26, 2025

(54) REFERENCE SIGNAL COMPENSATION TO TRAIN NEURAL NETWORK

(71) Applicant: Nokia Technologies Oy, Espoo (FI)

(72) Inventors: Nuan Song, Shanghai (CN); Tao Yang, Shanghai (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 394 days.

(21) Appl. No.: 18/000,416

(22) PCT Filed: Dec. 1, 2020

(86) PCT No.: PCT/CN2020/133061
§ 371 (c)(1),
(2) Date: Dec. 1, 2022

(87) PCT Pub. No.: WO2021/248852
PCT Pub. Date: Dec. 16, 2021

(65) Prior Publication Data
US 2023/0216597 A1    Jul. 6, 2023

(30) Foreign Application Priority Data
Jun. 8, 2020   (WO) ............... PCT/CN2020/094956

(51) Int. Cl.
H04W 4/00    (2018.01)
H04B 17/391  (2015.01)
H04L 5/00    (2006.01)

(52) U.S. Cl.
CPC ......... *H04B 17/391* (2015.01); *H04L 5/0051* (2013.01); *H04L 5/0064* (2013.01)

(58) Field of Classification Search
CPC ... H04B 17/391; H04B 7/0626; H04L 5/0051; H04L 5/0064; H04L 25/0254;
(Continued)

(56) References Cited

U.S. PATENT DOCUMENTS 9,585,044 B2 *  2/2017  Park .................... H04B 7/0626
10,615,912 B2 *  4/2020  Tong .................... H04B 7/0413
(Continued)

FOREIGN PATENT DOCUMENTS

CN      1665161 A    9/2005
CN    102104486 A    6/2011
(Continued)

OTHER PUBLICATIONS

Extended European Search Report received for corresponding European Patent Application No. 20939850.2, dated Jul. 15, 2024, 11 pages.
(Continued)

*Primary Examiner* — Phuongchau Ba Nguyen
(74) *Attorney, Agent, or Firm* — Lippes Mathias LLP

(57) ABSTRACT

Example embodiments of the present disclosure relate to compensating reference signals to train a neural network. According to embodiments of the present disclosure, a solution for compensating reference signals to train a neural network is proposed. A second device transmits information to a first device. The information is used to trigger generation and transmission of compensated training reference signals. The information indicates a set of receiving ports at the first device. The first device compensates the training reference signals based on downlink channel information and transmits the compensated signals to the second device via one or more transmitting ports. In this way, CSI can be obtained more accurately. Further, a processing model at the second device can be improved.

20 Claims, 9 Drawing Sheets

(58) Field of Classification Search
CPC ... H04L 5/005; H04L 25/0224; H04L 5/0007; G06N 3/09; H04W 28/04; H04W 72/04; H04W 72/042; H04W 88/08; H04W 28/08; H04W 28/084; H04W 36/22; H04W 72/01
See application file for complete search history.

(56) References Cited

U.S. PATENT DOCUMENTS

| | | | | |
|---|---|---|---|---|
| 10,637,551 | B2* | 4/2020 | Wang | H04B 17/391 |
| 11,337,095 | B2* | 5/2022 | Zeng | H04L 5/0057 |
| 2005/0128953 | A1 | 6/2005 | Wallace et al. | |
| 2013/0244676 | A1 | 9/2013 | Koivisto et al. | |
| 2014/0126436 | A1* | 5/2014 | Safavi | H04B 1/52 370/295 |
| 2016/0111770 | A1 | 4/2016 | Choi et al. | |
| 2020/0052757 | A1 | 2/2020 | Wang et al. | |
| 2020/0136700 | A1* | 4/2020 | Bogale | H04B 7/0456 |

FOREIGN PATENT DOCUMENTS

| | | |
|---|---|---|
| CN | 102724149 A | 10/2012 |
| CN | 107104742 A | 8/2017 |
| CN | 108141257 A | 6/2018 |
| CN | 108933609 A | 12/2018 |
| CN | 209844960 U | 12/2019 |
| EP | 0752656 A2 | 1/1997 |
| WO | 2021/248280 A1 | 12/2021 |

OTHER PUBLICATIONS

"IEEE 802.11", Wikipedia, Retrieved on Dec. 19, 2022, Webpage available at : https://en.wikipedia.org/wiki/IEEE 802.11.
International Search Report and Written Opinion received for corresponding Patent Cooperation Treaty Application No. PCT/CN2020/133061, dated Feb. 19, 2021, 10 pages.
Office action received for corresponding Chinese Patent Application No. 202080104547.X, dated Feb. 28, 2025, 7 pages of Office Action and No. page of translation available.

* cited by examiner

REFERENCE SIGNAL COMPENSATION TO TRAIN NEURAL NETWORK

RELATED APPLICATION

This application was originally filed as PCT Application No. PCT/CN2020/133061, filed on 1 Dec. 2020, which claims priority from PCT Application No. PCT/CN2020/094956, filed on 8 Jun. 2020, each of which is incorporated herein by reference in its entirety.

FIELD

Embodiments of the present disclosure generally relate to the field of telecommunication and in particular, to methods, devices, apparatuses and computer readable storage medium for compensating reference signals to train a neural network.

BACKGROUND

In wireless communications, channel information (for example, channel state information (CSI)) refers to known channel properties of a communication link. This information describes how a signal propagates from the transmitter to the receiver and represents the combined effect of, for example, scattering, fading, and power decay with distance. The CSI makes it possible to adapt transmissions to current channel conditions, which is crucial for achieving reliable communication with high data rates in multi antenna systems. Several solutions for obtaining the CSI have been proposed. Thus, it is very important to ensure accuracy of the CSI.

SUMMARY

In general, example embodiments of the present disclosure provide a solution for compensating reference signals to train a neural network.

In a first aspect, there is provided a first device. The first device comprises at least one processor; and at least one memory including computer program codes; the at least one memory and the computer program codes are configured to, with the at least one processor, cause the first device to receive information indicating a set of receiving ports to be used for compensation at the first device. The first device is yet caused to determine at least one compensation parameter associating the set of receiving ports with a set of transmitting ports based on downlink channel information. The first device is also caused to compensate at least one training reference signal with the at least one compensation parameter. The first device is further caused to transmit, to a second device, the at least one compensated training reference signal via the set of transmitting ports of the first device.

In a second aspect, there is provided a second device. The second device comprises at least one processor; and at least one memory including computer program codes; the at least one memory and the computer program codes are configured to, with the at least one processor, cause the second device to transmit, to a first device, information indicating a set of receiving ports to be used for compensation at the first device. The second device is further caused to receive, from the first device, at least one compensated training reference signal transmitted via a set of transmitting ports of the first device, the at least one compensated training reference signal being compensated with at least one compensation parameter associating the set of receiving ports with the set of transmitting ports which is determined based on downlink channel information.

In a third aspect, there is provided a method. The method comprises receiving information indicating a set of receiving ports to be used for compensation at a first device. The method further comprises determining at least one compensation parameter associating the set of receiving ports with a set of transmitting ports based on downlink channel information. The method also comprises compensating at least one training reference signal with the at least one compensation parameter. The method further comprises transmitting, to a second device, the at least one compensated training reference signal via the set of transmitting ports of the first device.

In a fourth aspect, there is provided a method. The method comprises transmitting, at a second device and to a first device, information indicating a set of receiving ports to be used for compensation at the first device. The method also comprises receiving, from the first device, at least one compensated training reference signal transmitted via a set of transmitting ports of the first device, the at least one compensated training reference signal being compensated with at least one compensation parameter associating the set of receiving ports with the set of transmitting ports based on downlink channel information which is determined based on downlink channel information.

In a fifth aspect, there is provided an apparatus. The apparatus comprises means for receiving information indicating a set of receiving ports to be used for compensation at a first device; means for determining at least one compensation parameter associating the set of receiving ports with a set of transmitting ports based on downlink channel information; means for compensating at least one training reference signal with the at least one compensation parameter; and means for transmitting, to a second device, the at least one compensated training reference signal via the set of transmitting ports of the first device.

In a sixth aspect, there is provided an apparatus. The apparatus comprises means for transmitting, at a second device and to a first device, information indicating a set of receiving ports to be used for compensation at the first device; and means for receiving, from the first device, at least one compensated training reference signal transmitted via a set of transmitting ports of the first device, the at least one compensated training reference signal being compensated with at least one compensation parameter associating the set of receiving ports with the set of transmitting ports which is determined based on downlink channel information.

In a seventh aspect, there is provided a computer readable medium. The computer readable medium comprises program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
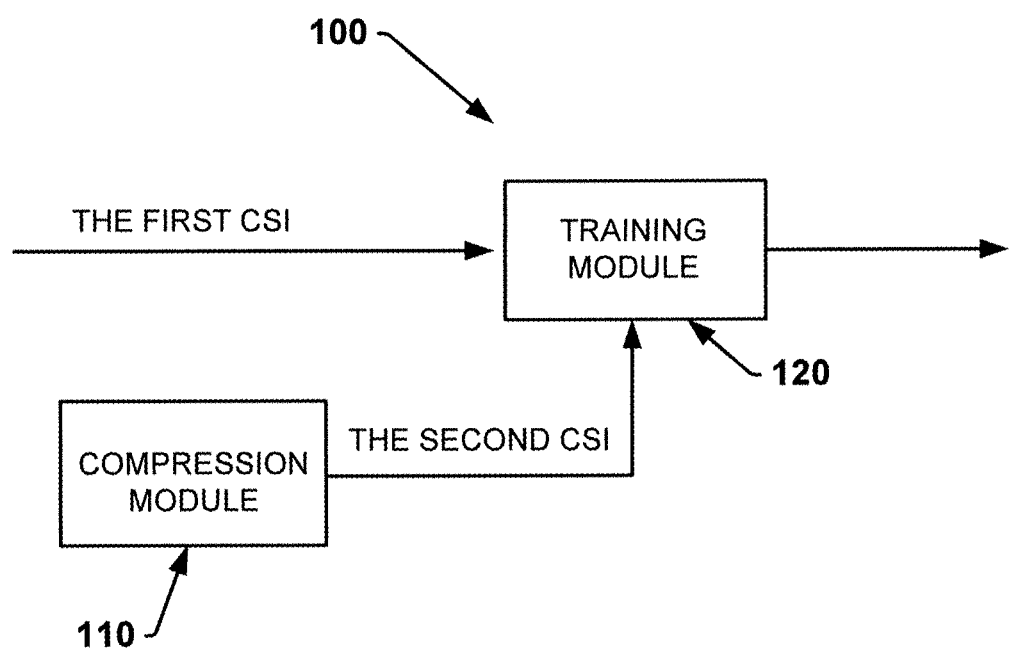
FIG. 1 illustrates a simplified block diagram of training model according to some example embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, the future sixth generation (6G), and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated and Access Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, how to obtain the CSI is very important for communication performance. The Machine Learning (ML) based Multiple Input and Multiple Output (MIMO) attracts significant attentions and shows its advantages especially in the physical layer solutions such as beamforming and Channel State Information (CSI) acquisition. The ML based massive MIMO schemes can provide a performance enhancement and reduce the computational complexity, overhead, as well as latency.

A lot of ML schemes on CSI acquisition (for example, including channel estimation, feedback and the like) and beamforming may train the Neural Network (NN) offline using statistical channel models, ray-tracing generated data, or measurement data, for analysis purpose. Since the dataset used in the pre-training cannot totally represent the real environment, when such an NN is deployed in practice, it requires a further training to update the weights of the pre-trained NN. In some other cases, it might be also possible to directly train the NN in the deployed real scenario. For example, in the CSI feedback and channel estimation applications, training of the NN requires paired dataset (for example, the true or "reference" CSI and the compressed CSI), however, it is extremely difficult to obtain the true CSI in practice. Some conventional technologies only assume that the exact CSI can be obtained to train or update the NN in the deployment.

One conventional solution is to apply high-resolution CSI feedback to train the NN in the real deployment. However, the data collection leads to a very large overhead. Even though it is high-resolution, it is still far from the exact value, since the UE needs to quantize the estimated CSI. Such CSI quantization with a high resolution considered as the reference CSI would also degrade the performance of the NN.

In Time Division Duplex (TDD) system, due to the reciprocity, it is straightforward to use uplink CSI to train the NN which is used for downlink. However, in FDD system when reciprocity does not hold, such a concept cannot be applied. A solution for channel information reporting for applying uplink channel information to determine data processing model deployed for downlink use has been proposed. A data processing model is determined using uplink dataset (for example, uplink reference signal), then the data processing model is used to process downlink CSI.

FIG. 1 illustrates a simplified block diagram of an apparatus 100 for training model according to some example embodiments of the present disclosure. The apparatus 100 may comprise a module 110 which can be used for compressing the first CSI to obtain the second CSI. The second CSI may have less information than the first CSI. The apparatus may also comprise a module 120 which can be used for training the data processing model based on the first CSI and the second CSI. In this way, the downlink CSI can be obtained more accurate by using the data processing model.

Figure 2:
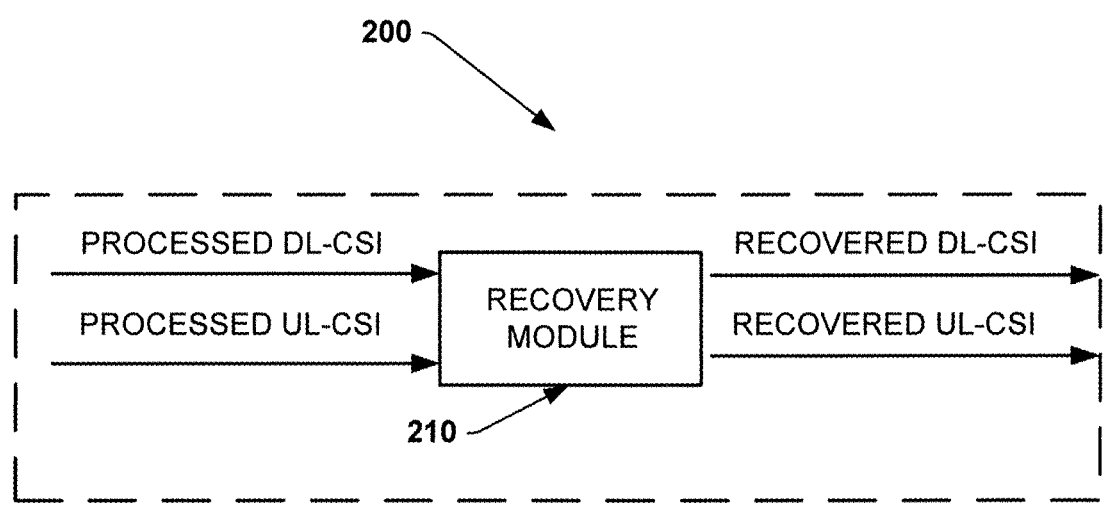
FIG. 2 illustrates a simplified block diagram of training model according to other example embodiments of the present disclosure.

During implementation of NN, one problem is that in the NN operating phase, the NN may not always work. Therefore, a monitoring mechanism is required to detect errors or malfunction of the NN. A solution for monitoring a data processing model for channel information is proposed. Two parallel measures by the data processing model for both the uplink and the downlink channels are used to determine whether the data processing model is available. FIG. 2 illustrates a simplified block diagram of an apparatus 200 for training model according to some example embodiments of the present disclosure.

The apparatus 200 may comprise a module 210 which can be used for recovering uplink information and downlink information using the data processing model. For example, the module 210 may recover the downlink channel information from the processed downlink information and recover the uplink channel information from the processed uplink information. The recovered downlink channel information and the processed channel downlink information are compared and the recovered uplink channel information and the processed channel uplink information are compared. The data processing model is updated based on the comparisons.

One crucial issue needs to be specified and solved is how the network device and terminal device can be coordinated to provide the uplink dataset, i.e., to how to generate training reference signal in Frequency Division Duplex (FDD), when the terminal device has asymmetric transceivers. Conventionally, such as FDD based reciprocity problems, the compensation is carried out at the network device side and the transceivers are symmetric. For example, the uplink channel covariance is compensated to the downlink used for transmit processing design at the network device, where such a compensation should be for the instantaneous usage. The algorithm is implementation related, and conventional technologies mainly consider the aspects which are algorithms and non-overlapped/non-related.

According to embodiments of the present disclosure, a solution for compensating reference signals to train a neural network is proposed. A second device transmits information to a first device. The information is used to trigger generation and transmission of compensated reference signals. The information indicates a set of receiving ports at the first device. The first device compensates the reference signals based on downlink channel information and transmits the compensated signals to the second device via one or more transmitting ports. In this way, CSI can be obtained more accurately. Further, a processing model at the second device can be improved.

Figure 3:
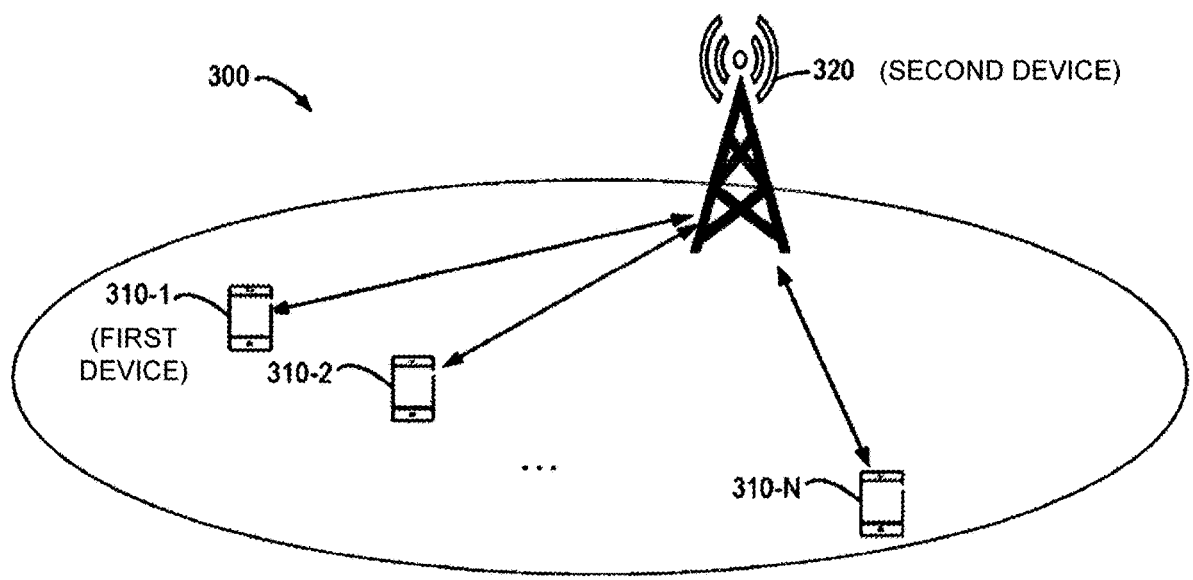
FIG. 3 illustrates an example communication environment in which example embodiments of the present disclosure can be implemented.

FIG. 3 illustrates a schematic diagram of a communication environment 300 in which embodiments of the present disclosure can be implemented. The communication environment 100, which is a part of a communication network, comprises a device 310-1, a device 310-2, . . . , a device 310-N, which can be collectively referred to as "first device(s) 310." The communication environment 300 comprises a second device 320. The parameter N can be any suitable number. The first device 310 and the second device 320 can communicate with each other.

The communication environment 300 may comprise any suitable number of devices and cells. In the communication environment 300, the first device 310 and the second device 320 can communicate data and control information to each other. In the case that the first device 310 is the network device and the second device 320 is the terminal device, a link from the second device 320 to the first device 310 is referred to as an uplink (UL), while a link from the first device 310 to the second device 320 is referred to as a downlink (DL). The second device 320 and the first device 310 are interchangeable.

It is to be understood that the number of first devices and cells and their connections shown in FIG. 3 is given for the purpose of illustration without suggesting any limitations. The communication environment 300 may include any suitable number of devices and networks adapted for implementing embodiments of the present disclosure.

Communications in the communication environment 300 may be implemented according to any proper communication protocol(s), comprising, but not limited to, cellular communication protocols of the first generation (1G), the second generation (2G), the third generation (3G), the fourth generation (4G), the fifth generation (5G), the sixth (6G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Figure 4:
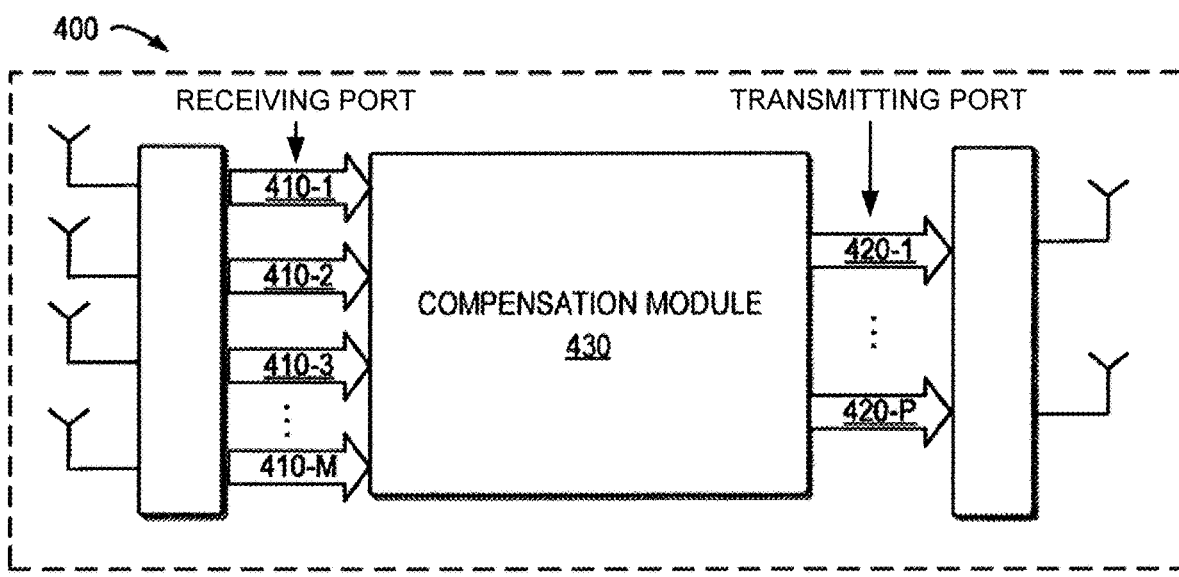
FIG. 4 illustrates a simplified block diagram of compensating reference signals according to some example embodiments of the present disclosure.

FIG. 4 illustrates a simplified block diagram of an apparatus 400 for compensating training reference signals according to some example embodiments of the present disclosure. The apparatus 400 can be implemented at the first device 310. Alternatively, the apparatus 400 may be implemented at the second device 320. It should be noted that embodiments of the present disclosure are not limited to this aspect.

The apparatus 400 may comprise receiving ports 410-1, 410-2, 410-3, . . . , 410-M, which can be collectively referred to as "receiving port(s) 410." The apparatus 400 may also comprise transmitting ports 420-1, . . . , 420-P, which can be collectively referred to as "transmitting port(s) 420." It is to be understood that the number of receiving ports and the number of transmitting ports as shown in FIG. 4 are only given for the purpose of illustration without suggesting any limitations. The apparatus 400 may include any suitable number of receiving ports and transmitting ports adapted for implementing embodiments of the present disclosure.

The apparatus 400 may comprise a compensation module 230 which can be used for compensating training reference signals. The downlink channel information may be extracted from the receiving ports 410. The compensation module 230 may compensate the training reference signal based on the downlink channel information. The training reference signal may be transmitted via the transmitting port 420-1. The training reference signal may be any suitable reference signals. Embodiments of the present disclosure are not limited in this aspect.

Figure 5:
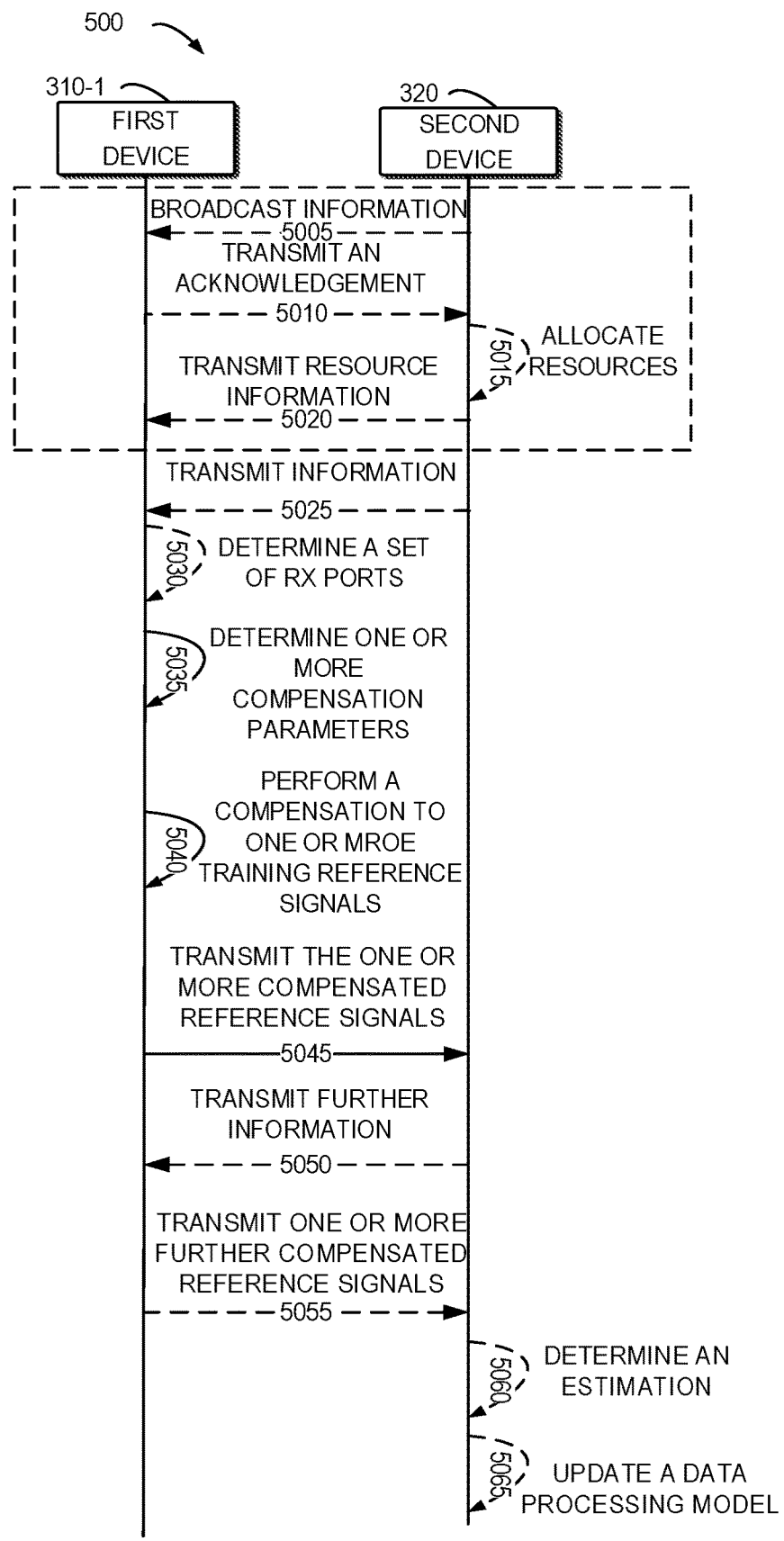
FIG. 5 illustrates a signaling flow for applying uplink channel information to determine data processing model deployed for downlink use according to some example embodiments of the present disclosure.

Example embodiments of the present disclosure will be described in detail below with reference to the accompanying drawings. Reference is now made to FIG. 5, which illustrates a signaling flow 500 for training a downlink data processing model with uplink channel information according to example embodiments of the present disclosure. For the purpose of discussion, the signaling flow 500 will be described with reference to FIG. 3. The signaling flow 500 may involve the first device 310-1 and the second device 320.

The second device 320 transmits information to the first device 310-1. The information may indicate a set of receiving ports at the first device 310-1. The information may be used to trigger the first device 310-1 to compensate one or more training reference signals and transmit the one or more compensated training reference signals. In some embodiments, the information may comprise indexes of the receiving ports at the first device 310-1. Alternatively, the second device may understand how the receiving ports at the first device 310-1 are divided into different groups. In this situation, the information may indicate a divided group of receiving ports at the first device 310-1. In other embodiments, the information may indicate the number of receiving ports to be used for compensation at the first device. Alternatively, the information may indicate mapping between the set of receiving ports and a set of transmitting ports to be used for compensation at the first device. The number of ports in the set of transmitting ports can be any suitable number. For example, the set of transmitting ports may comprise one or more transmitting ports.

Only for the purpose of illustrations, it assumes that there are four receiving ports 410-1, 410-2, 410-3 and 410-4 (not shown) and two transmitting ports 420-1 and 420-2 (not shown) at the first device 310-1. The second device 320 may determine two groups of receiving ports. For example, the receiving ports 410-1 and 410-2 may correspond to the transmitting ports 420-1 and 420-2, and the receiving ports 410-3 and 410-4 may correspond to the transmitting ports 420-1 and 420-2. Only as an example, the information may indicate the receiving ports 410-1 and 410-2. Alternatively, the information may also indicate that the receiving ports 410-1 and 410-2 may correspond to the transmitting ports 420-1 and 420-2, and the receiving ports 410-3 and 410-4 may correspond to the transmitting ports 420-1 and 420-2. It should be noted that the information may indicate any one or more of suitable receiving ports at the first device 310-1.

In some embodiments, as shown in FIG. 5, the second device 320 may broadcast 5005 the information to the first device 310-1. For example, this broadcast information may include triggering UE's behavior, i.e., compensation of training reference signals, and transmission of compensated training reference signals. In some embodiments, the information can be sent in an initial access procedure.

If the first device 310-1 agrees to send the compensated training reference signals, the first device 310-1 may transmit 5010 an acknowledgment to the information to the second device 320. If the first device 310-1 refuses to send the compensated training reference signals, the first device 310-1 may not transmit any responses to the second device 320.

If the acknowledgment is received from the first device 310-1, the second device 320 may allocate 5015 resource(s) for transmitting the compensated training reference signals. The resources may be any suitable resources for transmitting signals by the first device 310-1. The second device 320 may transmit 5020 resource information indicating allocated resources to the first device 310-1.

Alternatively, the second device 320 may transmit 5025 the information to the first device 310-1 via a dedicated signaling. The information may be specific to the first device 310-1. In the case when the second device 320 needs updating the neural network during its operating procedure, for example, the case that the second device 320 hasn't come across before due to the specific UE situation, the second device 320 needs to collect such data to train and enhance the neural network. This UE-specific information may indicate both compensation of the training reference signals and transmission of compensated training reference signals from this terminal device 310-1.

In some embodiments, the first device 310-1 may determine 5030 the set of receiving ports to be used for compensation based on the information. For example, if the information comprises explicit indexes of the receiving ports, the first device 310-1 may determine the set of receiving ports based on the explicit indexes. Alternatively, if the information indicates a divided group, the first device 310-1 may determine the set of receiving ports based on the divided group. For example, if the information indicates the first group, the first device 310-1 may determine the receiving ports 410-1 and 410-2 which belong to the first group.

The first device 310-1 determines 5035 one or more compensation parameters associating the set of receiving ports with the set of transmitting ports based on downlink channel information. The downlink channel information may comprise downlink channel covariance. For example, the downlink channel information may comprise downlink channel covariance of all receiving ports. In some embodiments, the first device 310-1 may extract angle information from the downlink channel covariance. In some embodiments, the first device 310-1 may determine a predefined direction of arrival (DOA) based on the downlink channel information estimated at all receiving ports. The downlink channel information may be obtained by the first device 310-1 previously. For example, the first device 310-1 may receive channel state information (CSI) reference signals from the second device 320 via each of the receiving port 410 at the first device 310-1. The downlink channel information of each of the receiving port 410 may be estimated based on the CSI reference signals received from the second device 320. In some embodiments, the predefined DOA may be the maximum DOA. It should be noted that the predefined DOA may be any suitable DOA. Note that the compensation parameter can be determined using any suitable methods not limited to above embodiments.

In some embodiments, the first device 310-1 may obtain phase information of received reference signals at the set of receiving ports when the uplink frequency is applied. The first device 310-1 may obtain phase information of received reference signals at the set of receiving ports when the downlink frequency is applied. The first device 310-1 may obtain phase differences at the set of receiving ports caused by the difference between uplink frequency and the downlink frequency. For example, the first device 310-1 may determine a first array response of the set of receiving ports 1 at a downlink frequency. A second array response of the set of transmitting ports −1 may be determined at an uplink frequency. The compensation parameter may be determined based on the first array response, the second array response and the predetermined DOA. Only as an example, consider the array response vector a(θ) for a Uniform Linear Antenna ULA with N elements/ports when a single plane wave from direction θ relative to the array bore sight is impinging upon the array. This vector can be written as:

$$a(\theta) = \begin{bmatrix} 1 \\ e^{-j2\pi \frac{d}{c} f_c \sin(\theta)} \\ \vdots \\ e^{-j2\pi(N-1)\frac{d}{c} f_c \sin(\theta)} \end{bmatrix} \in C^N \quad (1)$$

where $f_c$ represents the carrier frequency, c represents the speed of the light, and d represents the distance between two adjacent antenna ports/elements (assumed the same for both uplink and downlink).

Only for the purpose of illustrations, it assumes that there are four receiving ports 410-1, 410-2, 410-3 and 410-4 (not shown) and two transmitting ports 420-1 and 420-2 (not shown) at the first device 310-1. The information may indicate the receiving ports 410-1 and 410-2. In this situation, the compensation parameter may be obtained by:

$$[T_{UE,1}(\theta_{max})]_{n,n} = \frac{[a_D(\theta_{max})]_n}{[a_U(\theta_{max})]_n}, \quad (2)$$

where T represents a compensation matrix, UE represents the first device 310-1, "1 "represents the first group of receiving ports (i.e., the receiving ports 410-1 and 410-2), $\theta_{max}$ represents the maximum DOA, $a_D(\theta_{max})$ represents the array response of the first device 310-1 in downlink, $a_U(\theta_{max})$ represents the array response of the first device 310-1 in uplink. $[X]_{n,n}$ represents the n-th row and n-th column of a matrix X, $[x]_n$ represents the n-th element of a vector x and n represents the receiving port in the set of receiving ports. In some embodiments, the compensation matrix may be designed to be diagonal for the ease of carrying out the port-specific compensation.

The first device 310-1 performs 5040 a compensation to one or more training reference signals. In some embodiments, the one or more training reference signals may be compensated in phase. Alternatively, the one or more training reference signals may be compensated in other aspects, for example, frequency domain. It should be noted that the one or more training reference signals can be compensated based on character differences between receiving ports and transmitting ports.

The first device 310-1 transmits 5045 the compensated one or more training reference signals to second device 320 via the set of transmitting ports. For example, the compensated training reference signal can be represented as:

$$T_{UE,1}(\theta_{max})s_1, \quad (3)$$

where T represents a compensation matrix, $\theta_{max}$ represents the maximum DOA, UE represents the first device 310-1, "1

"represents the first group of receiving ports (i.e., the receiving ports 410-1 and 410-2), and $s_1$ represents the training reference signal. The compensated training reference signal received at the second device 320 can be represented as:

$$Y_1 = H_{U,1} T_{UE,1}(\theta_{max}) s_1 + N_1, \quad (4)$$

where T represents a compensation matrix, $\theta_{max}$ represents the maximum DOA, UE represents the first device 310-1, "1" represents the first group of receiving ports (i.e., the receiving ports 410-1 and 410-2), $s_1$ represents the training reference signal, $N_1$ represents noise on the channel, $H_{U,1}$ responses an uplink channel response when applying the receiving ports 410-1 and 410-2, and $Y_1$ represents the received compensated training reference signal.

In some embodiments, the second device 320 may obtain compensated uplink channel response by:

$$H_{U,1}^{(c)} = H_{U,1} T_{UE,1}(\theta_{max}), \quad (5)$$

where T represents a compensation matrix, $\theta_{max}$ represents the maximum DOA, UE represents the first device 310-1, "1" represents the first group of receiving ports (i.e., the receiving ports 410-1 and 410-2), $H_{U,1}$ responses an uplink channel response when applying the receiving ports 410-1 and 410-2, and $H_{U,1}^{(c)}$ represents the compensated uplink channel response.

In some embodiments, the information may also indicate another set of receiving ports. Alternatively, the second device 320 may transmit 5050 further information. The further information may indicate the other set of receiving ports. In this way, the character of the receiving ports can be reflected by the transmitting ports. The CSI can be obtained more accurately.

Only for the purpose of illustrations, it assumes that there are four receiving ports 410-1, 410-2, 410-3 and 410-4 (not shown) and two transmitting ports 420-1 and 420-2 (not shown) at the first device 310-1. The further information may indicate the receiving ports 410-3 and 410-4. A further compensation parameter associating the other set of receiving ports with the set of transmitting ports may be determined based on the downlink channel information. The further compensation parameter may be determined in a similar method as determining the compensation parameter.

In some embodiments, the first device 310-1 may obtain phase information of received reference signals at the other set of receiving ports when the uplink frequency is applied. The first device 310-1 may obtain phase information of received reference signals at the other set of receiving ports when the downlink frequency is applied. The first device 310-1 may obtain phase differences at the other set of receiving ports caused by the difference between uplink frequency and the downlink frequency. In some embodiments, the first device 310-1 may determine another predefined direction of arrival (DOA) based on the downlink channel information estimated at all receiving ports. Please also note that the maximum DOA used for compensation during different periods of transmission could also be calculate differently to ensure an accurate compensation or transformation. In this situation, a further compensation parameter may be obtained by:

$$[T_{UE,2}(\theta_{max})]_{n,n} = \frac{[a_D(\theta_{max})]_n}{[a_U(\theta_{max})]_n}, \quad (6)$$

where T represents a compensation matrix, UE represents the first device 310-1, "2 "represents the second group of receiving ports (i.e., the receiving ports 410-3 and 410-4), ° max represents the maximum DOA, $a_D(\theta_{max})$ represents the array response of the first device 310-1 in downlink, $a_U(\theta_{max})$ represents the array response of the first device 310-1 in uplink. $[X]_{n,n}$ represents the n-th row and n-th column of a matrix X, $[x]_n$ represents the n-th element of a vector x and n represents the receiving port in the set of receiving ports. In some embodiments, the compensation matrix may be designed to be diagonal for the ease of carrying out the port-specific compensation.

The compensation may be performed to directly compensate the training reference signal, i.e., the first device 310-1 may translate the array response associated with the transmitting ports in the uplink to that associated with the receiving ports in the downlink and implement on the training reference signal. The second device 320 may see the compensated channel would be the pre-compensated uplink channel associated with the transmitting ports representing the statistics of the downlink channel associated with receiving ports. From the training reference point of view, it may compensate the training reference signal. From the channel point of view, it equivalently compensates the uplink channel to represent the downlink channel.

In some embodiments, the first device 310-1 may transmit 5055 one or more further compensated training reference signals to second device 320. For example, the further compensated training reference signal can be represented as:

$$T_{UE,2}(\theta_{max}) s_2, \quad (7)$$

where T represents a compensation matrix, $\theta_{max}$ represents the maximum DOA, UE represents the first device 310-1, "2" represents the second group of receiving ports (i.e., the receiving ports 410-3 and 410-4), and $s_2$ represents the further training reference signal. The further compensated training reference signal received at the second device 320 can be represented as:

$$Y_2 = H_{U,2} T_{UE,2}(\theta_{max}) s_2 + N_2, \quad (8)$$

where T represents a compensation matrix, $\theta_{max}$ represents the maximum DOA, UE represents the first device 310-1, "2" represents the second group of receiving ports (i.e., the receiving ports 410-3 and 410-4), $s_2$ represents the further training reference signal, $N_2$ represents noise on the channel, $H_{U,2}$ represents another response of the uplink channel when applying the receiving ports 410-3 and 410-4, and $Y_2$ represents the further received compensated training reference signal.

In some embodiments, the second device 320 may obtain further compensated uplink channel response by:

$$H_{U,2}^{(c)} = H_{U,2} T_{UE,2}(\theta_{max}), \quad (9)$$

where T represents a compensation matrix, $\theta_{max}$ represents the maximum DOA, UE represents the first device 310-1, "2" represents the second group of receiving ports (i.e., the receiving ports 410-3 and 410-4), $H_{U,2}$ represents another response of the uplink channel when applying the receiving ports 410-3 and 410-4, and $H_{U,2}^{(c)}$ represents another response of the compensated uplink channel.

In some embodiments, two kinds of UE's operations on the transmission of transmitting ports can be identified. One case is that UE has a capability of antenna switching. Two rounds of the compensated training reference signals may be transmitted via the transmitting ports 420-1 and 420-2 switched to the receiving ports (410-1, 410-22) and (410-3, 4104), respectively. The other case is when the first device 310-1 does not have antenna switching function, the transmitting ports cannot be switched to the receiving ports but need compensation operations related to the two groups of receiving ports. Two rounds of the compensated training reference signals may be transmitted via only the transmitting ports 420-1 and 420-2.

In some embodiments, for example, in NR, the first device 310-1 may have beamformed training reference signals to ensure a good transmission power. In this case, the first device 310-1 may beamform the compensated training reference signal using beamforming matrix $W_R$. The compensated training reference signal received by the second device 320 can be written as:

$$Y = H_U W_R T_{UE}(\theta_{max})s + N, \qquad (10)$$

where T represents a compensation matrix, $\theta_{max}$ represents the maximum DOA, UE represents the first device 310-1, s represents the training reference signal, N represents noise on the channel, $H_U$ represents response of the uplink channel, Y represents the received compensated training reference signals and $W_R$ represents the beamforming matrix.

In some embodiments, the second device 320 may determine 5060 an estimation of a compensated uplink channel between the first device 310-1 and the second device 320 based on the received training reference signal. The second device 320 may collect all groups of compensated references signals from all receiving ports. The complete compensated uplink channel used as the input data to the neural network may be constructed as:

$$H_U^{(c)} = [H_{U,1}^{(c)}, H_{U,2}^{(c)}], \qquad (11)$$

where $H_U^{(c)}$ represents total response of the compensated uplink channel, $H_{U,1}^{(c)}$ responses a compensated uplink channel response when applying the receiving ports 410-1 and 410-2, $H_{U,2}^{(c)}$ represents another response of the compensated uplink channel when applying the receiving ports 410-3 and 410-4

In some embodiments, the second device 320 may update 5065 a data processing model to be used for recovering channel information on a downlink channel between the first device 310-1 and the second device 320 based on the estimation. For example, the complete compensated uplink channel may be used as the input data to the neural network to update the data processing model.

According to embodiments of the present disclosure, the data processing model can be trained more accurately. Further, more completed channel information can be obtained and the CSI can be estimated more accurately. The training reference signal is not constantly required in the system as other reference signal. In the early phase of deploying a neural network, it is more often to request the training reference signal since many situations are not known and the neural network needs to be fine-tuned. After enough training data is collected, the neural network is more stable and requires updates only when it is necessary. Once the neural network achieves a relative robustness, almost no training is required in the current scenario.

Figure 6:
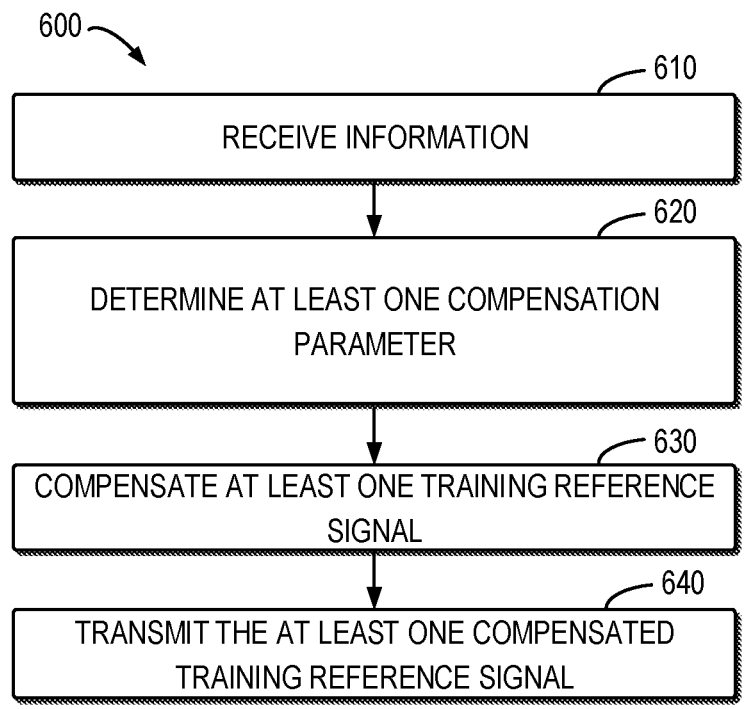
FIG. 6 illustrates a flowchart of a method implemented at a first apparatus according to some example embodiments of the present disclosure.

FIG. 6 shows a flowchart of an example method 600 implemented at a first device 310 in accordance with some example embodiments of the present disclosure. For the purpose of discussion, the method 600 will be described from the perspective of the first device 310.

At block 610, the first device 310-1 receives information from the second device 320. The information may indicate a set of receiving ports at the first device 310-1. The information may be used to trigger the first device 310-1 to compensate at least one training reference signal and transmit the at least one compensated training reference signal. In some embodiments, the information may comprise indexes of the receiving ports at the first device 310-1. Alternatively, the second device may understand how the receiving ports at the first device 310-1 are divided into different groups. In this situation, the information may indicate a divided group of the receiving ports at the first device 310-1. In other embodiments, the information may indicate the number of receiving ports. Alternatively, the information may indicate mapping between the set of receiving ports and a set of transmitting ports of the first device. The number of ports in the set of transmitting ports can be any suitable number. For example, the set of transmitting ports may comprise one or more transmitting ports.

In some embodiments, the information may be broadcasted to the first device 310-1. For example, this broadcast information may include triggering UE's behavior, i.e., compensation of training reference signals, and transmission of compensated training reference signals. In some embodiments, the information can be sent in an initial access procedure.

If the first device 310-1 agrees to send the compensated training reference signals, the first device 310-1 may transmit an acknowledgment to the information to the second device 320. If the first device 310-1 refuses to send the compensated training reference signals, the first device 310-1 may not transmit any responses to the second device 320. In some embodiments, the first device 310-1 may receive resource information indicating allocated resources to be used for transmission of the compensated training reference signals from the second device 320.

Alternatively, the information may be transmitted to the first device 310-1 via a dedicated signaling. The information may be specific to the first device 310-1. This UE-specific information may indicate both compensation of the training reference signals, and transmission of the compensated training reference signals from this terminal device 310-1.

In some embodiments, the first device 310-1 may determine the set of receiving ports based on the information. For example, if the information comprises explicit indexes of the receiving ports, the first device 310-1 may determine the set of receiving ports based on the explicit indexes. Alternatively, if the information indicates a divided group, the first device 310-1 may determine the set of receiving ports based on the divided group.

At block 620, the first device 310-1 determines at least one compensation parameter associating the set of receiving ports with a set of transmitting ports based on downlink channel information. The downlink channel information may comprise downlink channel covariance. In some embodiments, the first device 310-1 may extract angle information from the downlink channel covariance. In some embodiments, the first device 310-1 may determine a predefined direction of arrival (DOA) based on the downlink channel information estimated at all receiving ports. The downlink channel information may be obtained by the first device 310-1 previously. The downlink channel information of each of the receiving port 410 may be determined based on the downlink CSI-RS from the second device 320. In some embodiments, the predefined DOA may be the maximum DOA. It should be noted that the predefined DOA may be any suitable DOA. Note that the compensation parameter can be determined using any suitable methods not limited to above embodiments.

In some embodiments, the first device 310-1 may obtain phase information of received reference signals at the set of receiving ports when the uplink frequency is applied. The first device 310-1 may obtain phase information of received reference signals at the set of receiving ports when the downlink frequency is applied. The first device 310-1 may obtain phase differences caused by the difference between uplink frequency and the downlink frequency. For example, the first device 310-1 may determine a first array response of the set of receiving ports at a downlink frequency. A second array response of the set of transmitting ports may be determined at an uplink frequency. The compensation parameter may be determined based on the first array response, the second array response and the predetermined DOA.

At block 630, the first device 310-1 compensates at least one training reference signal with the at least one compensation parameter. In some embodiments, the at least one training reference signal may be compensated in phase. Alternatively, the at least one training reference signal may be compensated in other aspects, for example, frequency domain. It should be noted that the at least one training reference signal can be compensated based on character differences between receiving ports and transmitting ports of the first device 310-1.

At block 640, the first device 310-1 transmits the at least one compensated training reference signal to second device 320 via the set of transmitting ports. In some embodiments, the information may also indicate another set of receiving ports. Alternatively, the first device 310-1 may receive further information. The further information may indicate the other set of receiving ports to be used for compensation.

At least one further compensation parameter associating the other set of receiving ports with the set of transmitting ports may be determined based on the downlink channel information. The at least one further compensation parameter may be determined in a similar method as determining the at least one compensation parameter. In some embodiments, the first device 310-1 transmits at least one further compensated training reference signal to the second device 320.

Figure 7:
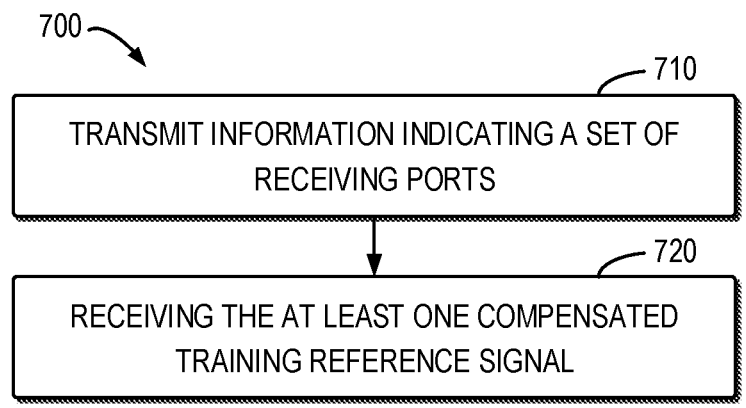
FIG. 7 illustrates a flowchart of a method implemented at a second apparatus according to some other example embodiments of the present disclosure.

FIG. 7 shows a flowchart of an example method 700 implemented at a second device 320 in accordance with some example embodiments of the present disclosure. For the purpose of discussion, the method 700 will be described from the perspective of the second device 320. It should be noted that the dashed blocks are optional.

At block 710, the second device 320 transmits information to the first device 310-1. The information may indicate a set of receiving ports to be used for compensation at the first device 310-1. The information may be used to trigger the first device 310-1 to compensate at least one training reference signal and transmit the at least one compensated training reference signal. In some embodiments, the information may comprise indexes of the receiving ports at the first device 310-1. Alternatively, the second device may understand how the receiving ports at the first device 310-1 are divided into different groups. In this situation, the information may indicate a divided group of receiving ports to be used for compensation. In other embodiments, the information may indicate the number of receiving ports. Alternatively, the information may indicate mapping between the set of receiving ports and a set of transmitting ports of the first device. The number of ports in the set of transmitting ports can be any suitable number. For example, the set of transmitting ports may comprise one or more transmitting ports.

In some embodiments, the second device 320 may broadcast the information to the first device 310-1. For example, this broadcast information may include triggering UE's behavior, i.e., compensation of training reference signals, and transmission of compensated training reference signals. In some embodiments, the information can be sent in an initial access procedure.

If the acknowledgment is received from the first device 310-1, the second device 320 may allocate resource(s) for transmitting the compensated training reference signals. The resources may be any suitable resources for transmitting signals. The second device 320 may transmit resource information indicating allocated resources to the first device 310-1.

Alternatively, the second device 320 may transmit the information to the first device 310-1 via a dedicated signaling. The information may be specific to the first device 310-1. In the case when the second device 320 needs updating the neural network during its operating procedure, for example, the case that the second device 320 hasn't come across before due to the specific UE situation, the second device 320 needs to collect such data to train and enhance the neural network. This UE-specific information may indicate both compensation of the training reference signals and transmission of compensated training reference signals from this terminal device 310-1.

At block 720, the second device 320 receiving at least one compensated training reference signal from the first device 310-1. In some embodiments, the second device 320 may transmit further information. The further information may indicate another set of receiving ports of the first device. In this way, the character of the receiving ports can be reflected by the transmitting ports. The CSI can be obtained more accurately. In some embodiments, the second device 320 receiving at least one further compensated training reference signal from the first device 310-1.

In some embodiments, the information may also indicate a further set of receiving ports. Alternatively, the second device 320 may transmit further information. The further information may indicate the further set of receiving ports. At least one further compensation parameter associating the further set of receiving ports with the set of transmitting ports may be determined based on the downlink channel information. The at least one further compensation parameter may be determined in a similar method as determining the at least one compensation parameter. The second device 320 may receive at least one further compensated training reference signal transmitted via the set of transmitting ports of the first device. The further compensated training reference signal may be compensated with the at least one further compensation parameter which is determined based on the downlink channel information.

In some embodiments, the second device 320 may determine an estimation of a compensated uplink channel between the first device 310-1 and the second device 320 based on the compensated training reference signal. The second device 320 may collect all groups of compensated references signals from all receiving ports.

In some embodiments, the second device 320 may update a data processing model to be used for recovering channel information on a downlink channel between the first device 310-1 and the second device 320 based on the estimation. For example, the complete compensated uplink channel may be used as the input data to the neural network to update the data processing model.

In some example embodiments, a first apparatus capable of performing any of the method 600 (for example, the first device 310) may comprise means for performing the respective operations of the method 600. The means may be implemented in any suitable form. For example, the means may be implemented in a circuitry or software module. The first apparatus may be implemented as or included in the first device 310. In some example embodiments, the means may comprise at least one processor and at least one memory including computer program code. The at least one memory and computer program code are configured to, with the at least one processor, cause performance of the apparatus.

In some embodiments, the apparatus comprises means for receiving information indicating a set of receiving ports to be used for compensation at a first device; means for determining at least one compensation parameter associating the set of receiving ports with a set of transmitting ports based on downlink channel information; means for compensating at least one training reference signal with the at least one compensation parameter; and means for transmitting, to a second device, the at least one compensated training reference signal via the set of transmitting ports of the first device.

In some embodiments, the apparatus further comprises means for receiving, from the second device, at least one channel state information reference signal (CSI-RS); and means for estimating the downlink channel information at all receiving ports of the first device based on the received CSI-RS, the downlink channel information comprising downlink channel covariance.

In some embodiments, the information further indicates mapping between the set of receiving ports and the set of transmitting ports to be used for compensation at the first device.

In some embodiments, the information is used to trigger the first device to compensate the at least one training reference signal and transmit the at least one compensated training reference signal.

In some embodiments, the means for determining the at least one compensation parameter comprises: means for determining a predefined direction of arrival based on the downlink channel information estimated at all receiving ports of the first device; means for determining a first array response of the set of receiving ports at a downlink frequency; means for determining a second array response of the set of transmitting ports at an uplink frequency; and means for determining the at least one compensation parameter based on the predefined direction of arrival, the first array response and the second array response.

In some embodiments, the predetermined direction of arrival is a maximum direction of arrival.

In some embodiments, the means for compensating the at least one training reference signal comprises: means for compensating the at least one training reference signal in phase based on the at least one compensation parameter.

In some embodiments, the information indicates a further set of receiving ports used for compensation, and the apparatus further comprises means for determining at least one further compensation parameter associating the further set of receiving ports with the set of transmitting ports based on the downlink channel information; means for compensating at least one further training reference signal with the at least one further compensation parameter; and means for transmitting, to the second device, the at least one further compensated training reference signal via the set of transmitting ports of the first device of the first device.

In some embodiments, the information is received via a broadcast signaling. The apparatus further comprises means for transmitting, to the second device, an acknowledgment to the information; and means for receiving, from the second device, resource information indicating resource allocation for transmitting at least one compensated training the reference signal.

In some embodiments, the information is specific to the terminal device.

In some example embodiments, a second first apparatus capable of performing any of the method 700 (for example, the second device 320) may comprise means for performing the respective operations of the method 700. The means may be implemented in any suitable form. For example, the means may be implemented in a circuitry or software module. The first apparatus may be implemented as or included in the second device 320. In some example embodiments, the means may comprise at least one processor and at least one memory including computer program code. The at least one memory and computer program code are configured to, with the at least one processor, cause performance of the apparatus.

In some embodiments, the apparatus comprises means for transmitting, at a second device and to a first device, information indicating a set of receiving ports to be used for compensation at the first device; and means for receiving, from the first device, at least one compensated training reference signal transmitted via a set of transmitting ports of the first device, the at least one compensated training reference signal being compensated with at least one compensation parameter associating the set of receiving ports with a set of transmitting ports which is determined based on downlink channel information.

In some embodiments, the apparatus further comprises means for transmitting, to first second device, at least one channel state information reference signal (CSI-RS) used for the first device to estimate the downlink channel information at all receiving ports of the first device.

In some embodiments, the information further indicates mapping between the set of receiving ports and the set of transmitting ports of the first device.

In some embodiments, the information is used to trigger the first device to compensate the at least one training reference signal and transmit the at least one compensated training reference signal.

In some embodiments, the information indicates a further set of receiving ports used for compensation. The apparatus further comprises means for receiving, from the first device, at least one further compensated training reference signal transmitted via the set of transmitting ports of the first device, the at least one further compensated training reference signal being compensated with at least one further compensation parameter associating the further set of receiving ports with the set of transmitting ports which is determined based on downlink channel information.

In some embodiments, the information is transmitted via a broadcast signaling. The apparatus further comprises means for receiving, from the first device, an acknowledgment to the information; and means for transmitting, to the second device, resource information indicating resource allocation for transmitting the at least one compensated training reference signal.

In some embodiments, the apparatus further comprises means for determining an estimation of a compensated uplink channel between the first device and the second device based on the at least one compensated received training reference signal; and means for updating a data processing model to be used for recovering channel information on a downlink channel between the first device and the second device based on the estimation.

In some embodiments, the information is specific to the terminal device.

Figure 8:
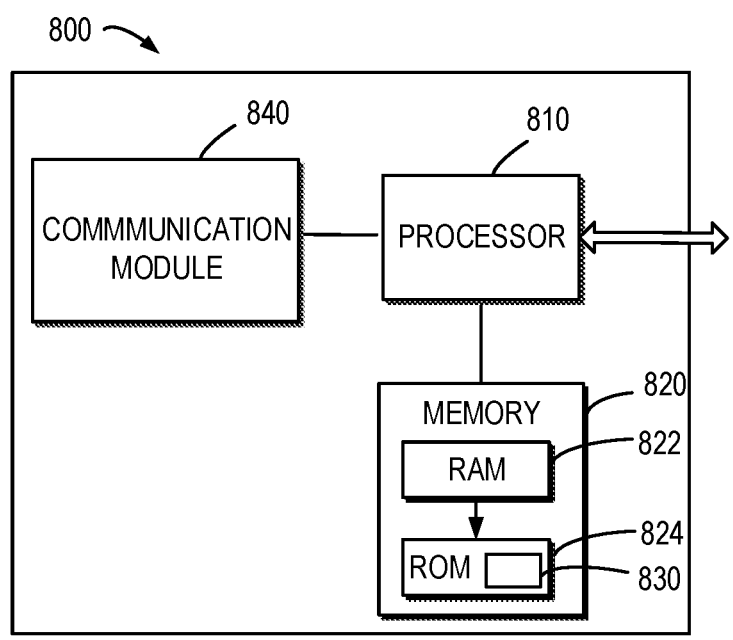
FIG. 8 illustrates a simplified block diagram of an apparatus that is suitable for implementing example embodiments of the present disclosure.

FIG. 8 is a simplified block diagram of a device 800 that is suitable for implementing example embodiments of the present disclosure. The device 800 may be provided to implement a communication device, for example, the first device 310 or the second device 320 as shown in FIG. 3. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 830 includes computer executable instructions that are executed by the associated processor 810. The program 830 may be stored in the memory, e.g., ROM 824. The processor 810 may perform any suitable actions and processing by loading the program 830 into the RAM 822.

Example embodiments of the present disclosure may be implemented by means of the program 830 so that the device 800 may perform any process of the disclosure as discussed with reference to FIGS. 5 to 7. The example embodiments of the present disclosure may also be implemented by hardware or by a combination of software and hardware.

Figure 9:
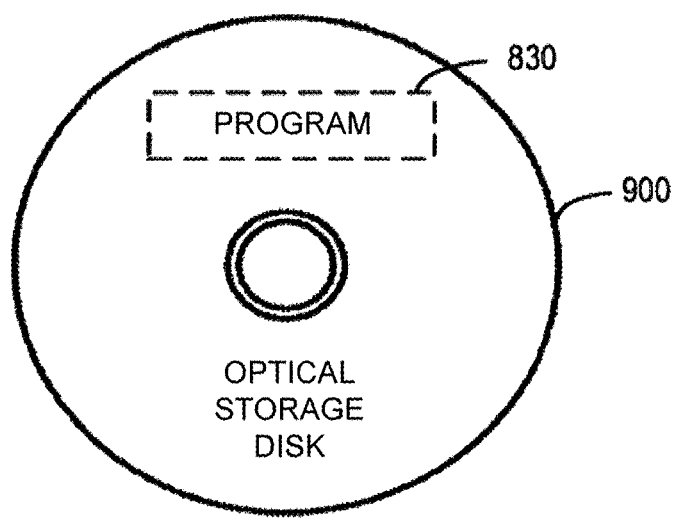
FIG. 9 illustrates a block diagram of an example computer readable medium in accordance with some example embodiments of the present disclosure.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. The computer readable medium may include any types of tangible non-volatile storage, such as ROM, EPROM, a flash memory, a hard disk, CD, DVD, and other magnetic storage and/or optical storage. FIG. 9 shows an example of the computer readable medium 900 in form of an optical storage disk. The computer readable medium has the program 830 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 5 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:
at least one processor; and
at least one memory
storing instructions that, when executed by the at least one processor, cause the first device at least to:
receive information indicating a set of receiving ports to be used for compensation at the first device;
determine at least one compensation parameter associating the set of receiving ports with a set of transmitting ports based on downlink channel information;
compensate at least one training reference signal with the at least one compensation parameter; and
transmit, to a second device, the at least one compensated training reference signal via the set of transmitting ports of the first device.

2. The first device of claim 1, wherein the first device is further caused to:
receive, from the second device, at least one channel state information reference signal (CSI-RS); and
estimate the downlink channel information at all receiving ports of the first device based on the received CSI-RS, wherein the downlink channel information comprises downlink channel covariance.

3. The first device of claim 1, wherein the information further indicating mapping between the set of receiving ports and the set of transmitting ports to be used for compensation at the first device.

4. The first device of claim 1, wherein the information is used to trigger the first device to compensate the at least one training reference signal and transmit the at least one compensated training reference signal.

5. The first device of claim 1, wherein the first device is caused to determine the at least one compensation parameter by:
determining a predefined direction of arrival based on the downlink channel information estimated at all receiving ports of the first device;
determining a first array response of the set of receiving ports at a downlink frequency;
determining a second array response of the set of transmitting ports at an uplink frequency; and
determining the at least one compensation parameter based on the predefined direction of arrival, the first array response and the second array response.

6. The first device of claim 5, wherein the predetermined direction of arrival is a maximum direction of arrival.

7. The first device of claim 1, wherein the first device is caused to compensate the at least one training reference signal by:
compensating the at least one training reference signal in phase based on the at least one compensation parameter.

8. The first device of claim 1, wherein the information indicates a further set of receiving ports used for compensation, and wherein the first device is caused to:
determine at least one further compensation parameter associating the further set of receiving ports with the set of transmitting ports based on the downlink channel information;
compensate at least one further training reference signal with the at least one further compensation parameter; and
transmit, to the second device, the at least one further compensated training reference signal via the set of transmitting ports of the first device.

9. The first device of claim 1, wherein the information is received via a broadcast signaling, and wherein the first device is further caused to:
transmit, to the second device, an acknowledgment to the information; and
receive, from the second device, resource information indicating resource allocation for transmitting the at least one compensated training reference signal.

10. The first device of claim 1, wherein the information is specific to the terminal device.

11. The first device of claim 1, wherein the first device comprises a terminal device and the second device comprises a network device.

12. A second device comprising:
at least one processor; and
at least one memory
storing instructions that, when executed by the at least one processor, cause the second device at least to:
transmit, to a first device, information indicating a set of receiving ports to be used for compensation at the first device; and
receive, from the first device, at least one compensated training reference signal transmitted via a set of transmitting ports of the first device, the at least one compensated training reference signal being compensated with at least one compensation parameter associating the set of receiving ports with a set of transmitting ports which is determined based on downlink channel information.

13. The second device of claim 12, wherein the second device is further caused to:
transmit, to the first device, at least one channel state information reference signal (CSI-RS) used for the first device to estimate the downlink channel information at all receiving ports of the first device.

14. The second device of claim 12, wherein the information further indicating mapping between the set of receiving ports and the set of transmitting ports of the first device.

15. The second device of claim 12, wherein the information is used to trigger the first device to compensate the at least one training reference signal and transmit the at least one compensated training reference signal.

16. The second device of claim 12, wherein the information indicates a further set of receiving ports used for compensation, and wherein the second device is further caused to:
receive, from the first device, at least one further compensated training reference signal transmitted via the set of transmitting ports of the first device, the at least one further compensated training reference signal being compensated with at least one further compensation parameter associating the further set of receiving ports with the set of transmitting ports which is determined based on downlink channel information.

17. The second device of claim 12, wherein the information is transmitted via a broadcast signaling, and wherein the second device is further caused to:
   receive, from the first device, an acknowledgment to the information; and
   transmit, to the first device, resource information indicating resource allocation for transmitting the at least one compensated training reference signal.

18. The second device of claim 12, wherein the second device is further caused to:
   determine an estimation of a compensated uplink channel between the first device and the second device based on the at least one compensated received training reference signal; and
   update a data processing model to be used for recovering channel information on a downlink channel between the first device and the second device based on the estimation.

19. The second device of claim 12, wherein the first device comprises a terminal device and the second device comprises a network device.

20. A method comprising:
   receiving information indicating a set of receiving ports to be used for compensation at a first device;
   determining at least one compensation parameter associating the set of receiving ports with a set of transmitting ports based on downlink channel information;
   compensating at least one training reference signal with the at least one compensation parameter; and
   transmitting, to a second device, the at least one compensated training reference signal via the set of transmitting ports of the first device.

* * * * *